United States Patent
Hayashi et al.

(10) Patent No.: US 9,897,751 B2
(45) Date of Patent: Feb. 20, 2018

(54) MULTICORE POLARIZATION-MAINTAINING FIBER

(71) Applicant: FUJIKURA LTD., Tokyo (JP)

(72) Inventors: Kazuyuki Hayashi, Sakura (JP); Katsuaki Izoe, Sakura (JP); Kazuhiko Aikawa, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 15/329,741

(22) PCT Filed: May 12, 2016

(86) PCT No.: PCT/JP2016/064194
§ 371 (c)(1),
(2) Date: Jan. 27, 2017

(87) PCT Pub. No.: WO2017/002460
PCT Pub. Date: Jan. 5, 2017

(65) Prior Publication Data
US 2017/0219768 A1 Aug. 3, 2017

(30) Foreign Application Priority Data
Jul. 2, 2015 (JP) ................................ 2015-133964

(51) Int. Cl.
*G02B 6/02* (2006.01)
*G02B 6/024* (2006.01)

(52) U.S. Cl.
CPC ......... *G02B 6/02042* (2013.01); *G02B 6/024* (2013.01); *G02B 6/02314* (2013.01)

(58) Field of Classification Search
CPC .............. G02B 6/105; G02B 6/02042; G02B 6/02314; G02B 6/024
See application file for complete search history.

(56) References Cited

U.S. PATENT DOCUMENTS 5,029,961 A * 7/1991 Suzuki ................. G02B 6/2826
385/126
5,420,949 A * 5/1995 Arima ................. G02B 6/2835
385/11

(Continued)

FOREIGN PATENT DOCUMENTS

JP 59-9304 U 1/1984
JP 62-178909 A 8/1987

(Continued)

OTHER PUBLICATIONS

International Search Report dated Aug. 9, 2016, issued in counterpart of International Application No. PCT/JP2016/064194 (2 pages).

*Primary Examiner* — Daniel Petkovsek
(74) *Attorney, Agent, or Firm* — Westerman, Hattori, Daniels & Adrian, LLP (57) ABSTRACT

A multicore polarization-maintaining fiber 10 includes a plurality of cores 11, a cladding 12 surrounding the plurality of cores 11, and a plurality of stress applying parts 15 provided sandwiching the plurality of cores 11 in a region surrounded by the outer circumferential surface of the cladding 12. The cross sectional area of the stress applying part 15 is greater than the cross sectional area of the core 11. Stress applying parts 15 of the plurality of stress applying parts 15 are disposed in a first direction, and stress applying parts 15 of the plurality of stress applying parts 15 are disposed in a second direction different from the first direction.

10 Claims, 3 Drawing Sheets

(56) References Cited

U.S. PATENT DOCUMENTS

| | | | | |
|---|---|---|---|---|
| 5,689,578 | A | * | 11/1997 | Yamauchi ......... C03B 37/01217 385/123 |
| 6,463,195 | B1 | * | 10/2002 | Sasaki .................. G02B 6/2835 385/43 |
| 6,813,414 | B1 | * | 11/2004 | Xie ...................... G02B 6/3812 385/11 |
| 9,529,146 | B2 | * | 12/2016 | Ishida ................. G02B 6/02042 |
| 2006/0171426 | A1 | * | 8/2006 | Starodoumov ....... H01S 3/0675 372/6 |
| 2013/0108206 | A1 | | 5/2013 | Sasaoka et al. |

FOREIGN PATENT DOCUMENTS

| | | |
|---|---|---|
| JP | 62-249114 A | 10/1987 |
| JP | 5-45527 A | 2/1993 |
| JP | 2013-80126 A | 5/2013 |

* cited by examiner

MULTICORE POLARIZATION-MAINTAINING FIBER

TECHNICAL FIELD

The present invention relates to a polarization-maintaining fiber having a plurality of cores.

BACKGROUND ART

Presently, optical fibers for use in commonly popular optical fiber communication systems have a structure in which the outer circumferential surface of a core is surrounded by a cladding. Optical signals are propagated through this core to transmit information. In these years, with the wide spread use of optical fiber communication systems, the volume of information to be transmitted is dramatically increased. In order to achieve an increase in the transmission capacity of these optical fiber communication systems, it is known that a multicore fiber having a plurality of cores and a cladding surrounding the outer circumferential surfaces of the plurality of cores is used to transmit a plurality of signals with light beams propagating through the cores.

For a coherent optical communication line to achieve an increase in the transmission capacity, a polarization-maintaining fiber is known. The polarization-maintaining fiber is an optical fiber that can propagate light beams with the polarized state of the light beams being maintained by giving a difference between the propagation constants of polarized waves orthogonal to each other. For example, for such polarization-maintaining fibers, there are an elliptical core polarization-maintaining fiber having an elliptical core in a cross section (see Patent Literature 1 below), a stress-applying polarization-maintaining fiber (in the following, referred to as a "PANDA" polarization-maintaining fiber) in which a core is sandwiched between a pair of stress applying parts to apply stress to the core for forming a core having orthogonal axes with the effective refractive indexes different from each other (see Patent Literature 2 below), and other polarization-maintaining fibers.

[Patent Literature 1] JP-A-2013-80126
[Patent Literature 2] JP-A-362-178909

SUMMARY OF INVENTION

However, the elliptical core polarization-maintaining fiber as described in Patent Literature 1 above commonly has polarization maintaining power smaller than the polarization maintaining power of the PANDA fiber. Typically, in a single-core PANDA polarization-maintaining fiber, the outer shape of the polarization-maintaining fiber is prone to be easily deformed. It is thought that this is because the stress applying parts apply stress not only to the core but also to the cladding. In other words, it is thought that in a polarization-maintaining fiber having stress applying parts disposed in only one direction, the stress applied from the stress applying parts to the cladding is easily concentrated to the one direction to easily deform the outer shape of the polarization-maintaining fiber. As described in FIGS. 1 and 2 in Patent Literature 2 above, in the case in which three or more stress applying parts are disposed in only one direction, the tendency of deforming the outer shape of the polarization-maintaining fiber as described above is more noticeable. In the optical fiber having its outer shape thus deformed, problems sometimes arise in that it is difficult to insert the optical fiber into the hole of a ferrule when connected and in that after the optical fiber is inserted into the ferrule and the gap between the optical fiber and the ferrule is filled with an adhesive, a sink of the hardened adhesive changes the stress applied to the core to cause the polarization maintaining power of the core to be changed.

The present inventors found that the disposition of the stress applying parts of the multicore polarization-maintaining fiber is optimized to reduce the deformation of the outer shape of the PANDA polarization-maintaining fiber.

Therefore, an object of the present invention is to provide a multicore polarization-maintaining fiber that reduces the deformation of its outer shape.

To solve the problem, a multicore polarization-maintaining fiber according to the present invention includes: a plurality of cores; a cladding surrounding the plurality of cores; and a plurality of stress applying parts provided sandwiching the plurality of cores in a region surrounded by an outer circumferential surface of the cladding, wherein: a cross sectional area of the stress applying part is greater than a cross sectional area of the core; and stress applying parts of the plurality of stress applying parts are disposed in a first direction in a cross section perpendicular to a longitudinal direction of the cladding and stress applying parts of the plurality of stress applying parts are disposed in a second direction different from the first direction.

The plurality of stress applying parts is disposed in a plurality of directions, not in one direction, allowing a reduction in the concentration of the stress applied from the stress applying parts to the cladding to one direction. That is, the direction of the stress applied from the stress applying parts to the cladding can be dispersed in multiple directions. Thus, the deformation of the outer shape of the multicore polarization-maintaining fiber can be reduced.

Preferably, the first direction is orthogonal to the second direction. The plurality of stress applying parts is disposed in the directions orthogonal to each other. Thus, the stress applied from the stress applying parts to the cladding also acts on the directions orthogonal to each other. Accordingly, the deformation of the outer shape of the multicore polarization-maintaining fiber is easily reduced.

Preferably, the plurality of stress applying parts is disposed along a plurality of parallel columns. The plurality of stress applying parts is disposed along a plurality of columns, also causing the direction of the stress applied from the stress applying parts to the cladding to be easily dispersed. Thus, the deformation of the outer shape of the multicore polarization-maintaining fiber is easily reduced.

Preferably, the plurality of stress applying parts is disposed at positions in 90 degree rotational symmetry based on a center of the cladding. The plurality of stress applying parts is disposed in this manner, also causing the direction of the stress applied from the stress applying parts to the cladding to be easily dispersed. Thus, the deformation of the outer shape of the multicore polarization-maintaining fiber is easily reduced.

Preferably, one of the plurality of stress applying parts is disposed in a center of the cladding. With this form, the stress applying parts are easily disposed in such a manner that the stress applying part disposed in the center of the cladding is paired with the stress applying parts disposed near the outer circumferential surface of the cladding as the paired stress applying parts sandwich the core. The cores and the stress applying parts are disposed in this manner, and thus the stress applying part disposed in the center of the cladding is provided between the adjacent cores. Consequently, the crosstalk between the adjacent cores can be reduced.

Preferably, the cores are each disposed between all the stress applying parts adjacent to each other. The cores are disposed in this manner, allowing many cores to be efficiently disposed in one multicore polarization-maintaining fiber. Thus, the transmission capacity of information is easily increased.

The multicore polarization-maintaining fiber preferably includes the cores whose directions sandwiched by the stress applying parts are different from each other at an angle of 90°. The cores whose directions sandwiched by the stress applying parts are different from each other at an angle of 90° have the directions of the fast axis and the slow axis different from each other at an angle of 90°. When signals are transmitted along the fast axis and the slow axis of the cores whose directions of the fast axis and the slow axis are different from each other, the propagation constants are changed. Thus, the crosstalk between the cores can be decreased.

The multicore polarization-maintaining fiber preferably includes the cores having cutoff wavelengths different from each other. The cores whose cutoff wavelengths are different from each other are included, giving resistance to bending or disturbance. Thus, the multicore polarization-maintaining fiber can be used as a single-mode optical fiber in a wide range of wavelengths even in the state in which bending or external stress is applied. In other words, light beams at different wavelengths can be passed through the cores. Consequently, a band per multicore polarization-maintaining fiber can be substantially widened. Moreover, the crosstalk between the cores can be decreased.

A form may be provided, in which the cores having cutoff wavelengths different from each other have birefringences different from each other. At least any one of the gap between a pair of the stress applying parts applying stress to the core, the size of the stress applying part, and the thermal expansion coefficient of the stress applying part is changed, allowing the birefringence of the core to be changed.

As described above, according to the present invention, there is provided a multicore polarization-maintaining fiber that reduces the deformation of its outer shape.

DESCRIPTION OF EMBODIMENTS

In the following, preferred embodiments of a multicore polarization-maintaining fiber according to the present invention will be described in detail with reference to the drawings. Note that, for better understanding, scales in the drawings are sometimes different from scales described the following description.

(First Embodiment)

Figure 1:
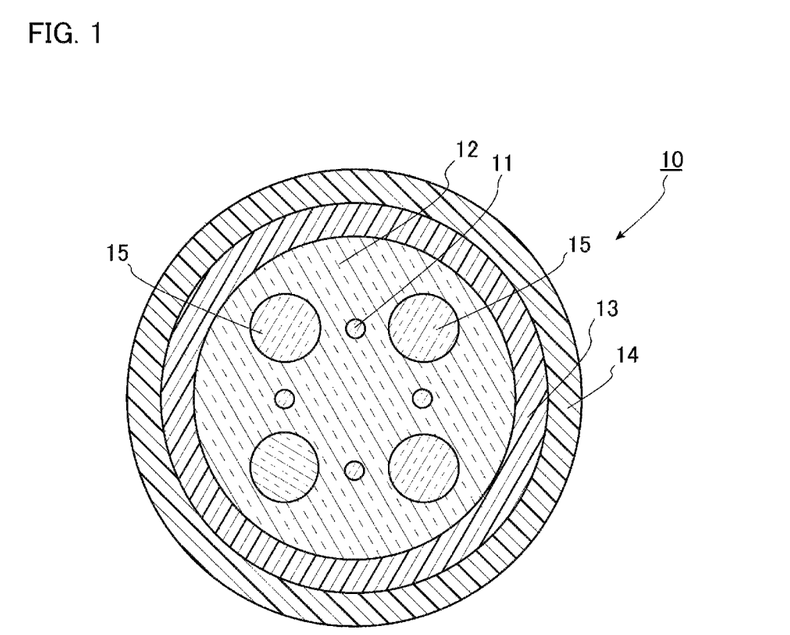
FIG. 1 is a diagram of a cross section perpendicular to the longitudinal direction of a multicore polarization-maintaining fiber according to a first embodiment of the present invention.

FIG. 1 is a diagram of a cross section perpendicular to the longitudinal direction of a multicore polarization-maintaining fiber 10 according to a first embodiment of the present invention.

As illustrated in FIG. 1, the multicore polarization-maintaining fiber 10 includes a plurality of cores 11, a cladding 12 surrounding the outer circumferential surfaces of the cores 11 with no gap, a plurality of stress applying parts 15 provided sandwiching the cores 11 in a region surrounded by the outer circumferential surface of the cladding 12, an inner protective layer 13 covering the outer circumferential surface of the cladding 12, and an outer protective layer 14 surrounding the outer circumferential surface of the inner protective layer 13. Note that, FIG. 1 illustrates a form in which four cores 11 and four stress applying parts 15 are provided by example.

The four cores 11 included in the multicore polarization-maintaining fiber 10 according to the embodiment are disposed at the positions of the apexes of a square where the center of the cladding 12 is set to the center. The refractive indexes of all the cores 11 are higher than the refractive index of the cladding 12. For example, in the case in which the core 11 is made of silica doped with a dopant, such as germanium, which increases the refractive index, the cladding 12 is made of pure silica. For example, in the case in which the core 11 is made of pure silica, the cladding 12 is made of silica doped with a dopant, such as fluorine, which decreases the refractive index.

In the four cores 11, at least two cores 11 with cutoff wavelengths different from each other are preferably included. One multicore polarization-maintaining fiber 10 includes the cores 11 with different cutoff wavelengths, giving resistance to bending or disturbance. Thus, the multicore polarization-maintaining fiber 10 can be used as a single-mode optical fiber in a wide range of wavelengths even in the state in which bending or external stress is applied. In other words, light beams at different wavelengths can be propagated through the cores 11. Consequently, a band per multicore polarization-maintaining fiber 10 can be substantially increased.

In the case in which the cores 11 included in the multicore polarization-maintaining fiber 10 have cutoff wavelengths different from each other as described above, a form including cores below can be provided, in which for example, the core 11 whose cutoff wavelength is 1.44 μm is in a single mode at a wavelength of 1.55 μm, the core 11 whose cutoff wavelength is 1.28 μm is in a single mode at a wavelength of 1.31 μm, the core 11 whose cutoff wavelength is 0.94 μm is in a single mode at a wavelength of 0.98 μm, and the core 11 whose cutoff wavelength is 0.8 μm is in a single mode at a wavelength of 0.85 μm. For example, a form including cores below can be provided, in which the relative refractive index difference of the core 11 to the cladding 12 is 0.4% and the cores 11 have cutoff wavelengths different from each other by changing the diameters of the cores 11 from each other. In this case, the multicore polarization-maintaining fiber 10 has almost no increase in attenuation even though the bending diameter is decreased. When the multicore polarization-maintaining fiber 10 is wound for ten times in a diameter of 30 mm, an increase in attenuation is 0.1 dB or less.

In order to provide the cores 11 with different cutoff wavelengths on one multicore polarization-maintaining fiber 10, in addition to the configuration as described above, in which the diameter of the core 11 is changed for each core 11, a configuration is named in which the relative refractive index difference of the core 11 to the cladding 12 is changed for each core 11. In order to change the relative refractive index difference of the core 11 to the cladding 12 for each core 11, the amount of a dopant, such as germanium, added to the core 11 only has to be changed for each core 11.

Next, the stress applying part 15 will be described. Four stress applying parts 15 included in the multicore polarization-maintaining fiber 10 according to the embodiment are disposed at the positions of the apexes of a square where the center of the cladding 12 is the center in such a manner that each one of the four cores 11 is sandwiched between the stress applying parts 15. Thus, the cores 11 are disposed on the sides of the square obtained by connecting the centers of the stress applying parts 15. The stress applying parts 15 and the cores 11 are disposed as described above, applying stress from the pair of stress applying parts 15 to the core 11 as described later.

The stress applying part 15 is formed of a material having a thermal expansion coefficient greater than the thermal expansion coefficient of the cladding 12, for example. In other words, in drawing a preform including materials forming the cores 11, the cladding 12, and the stress applying parts 15, the stress applying part 15 is formed of a material having a thermal expansion coefficient greater than the thermal expansion coefficient of the cladding 12 as described above. Thus, the stress applying part 15 is shrunk greater than the cladding 12 is in the process of cooling and hardening the materials, applying stress from the pair of stress applying parts 15 disposed sandwiching the core 11 to the core 11. More specifically, the pair of stress applying parts 15 applies tensile stress to the core 11 disposed between the pair of stress applying parts 15 in the direction in which the pair of stress applying parts 15 is arranged, and applies compressive stress in a direction perpendicular to this direction. The cores 11 and the stress applying parts 15 are disposed as described above. Thus, the stress applying parts 15 apply stress to two cores located in directions different from each other based on the center of the stress applying part 15.

In the core 11, to which the tensile stress and the compressive stress are applied from the pair of stress applying parts 15, the birefringence is induced by a photoelastic effect, and the core 11 has propagation constants different in polarization modes in two directions perpendicular to each other. Thus, light beams propagated through the core 11 have a slow axis in the direction in which the stress applying parts 15 are arranged, and have a fast axis in a direction perpendicular to this direction. The mode birefringence showing the polarization maintaining power of the multicore polarization-maintaining fiber 10 thus configured can be $4 \times 10^{-4}$ or more in the cores 11, for example.

Examples of a material forming the stress applying part 15 thus configured can include silica glass, with which a dopant, such as boron, is doped. The amount of boron, for example, added to silica glass is adjusted, allowing the thermal expansion coefficient of silica glass to be adjusted. In this manner, the thermal expansion coefficient difference of the stress applying part 15 to the cladding 12 is appropriately adjusted, or the interval to dispose the pair of stress applying parts 15 disposed sandwiching the core 11 (the shortest distance from the interface between one of the pair of stress applying parts 15 and the cladding 12 to the interface between the other stress applying part 15 and the cladding 12, the same thing is applied below) is appropriately adjusted, or the size of the stress applying part 15, for example, is appropriately adjusted. Thus, the strength of the stress applied from the pair of stress applying parts 15 to the core 11 can be adjusted, and the core 11 having a desired polarization maintaining power can be formed.

From the viewpoint of easily applying a predetermined stress to the core 11 by the pair of stress applying parts as described above, the shape, size, and thermal expansion coefficient of the pair of stress applying parts 15 are preferably the same, and the core 11 is preferably disposed in the center between the pair of stress applying parts 15. Meanwhile, a form may be provided, in which at least any one of the shape, size, and thermal expansion coefficient of the stress applying part 15 or the gap between the core 11 and the stress applying part 15 is changed to provide the cores 11 having birefringences different from each other on one multicore polarization-maintaining fiber 10.

Note that, the inner protective layer 13 and the outer protective layer 14 are made of resins, such as an ultraviolet curing resin, and the inner protective layer 13 and the outer protective layer 14 are made of resins different from each other.

As described above, in the multicore polarization-maintaining fiber 10 according to the embodiment, the stress applying parts 15 disposed as described above are disposed in such a manner that multiple stress applying parts 15 are disposed in a first direction and multiple stress applying parts 15 are also disposed in a second direction different from the first direction. The plurality of stress applying parts 15 is disposed in a plurality of directions, in not only one direction, reducing the concentration of the stress applied from the stress applying parts 15 to the cladding 12 in one direction. In forming the stress applying parts 15 as described above, the stress applying parts 15 apply stress to the core 11 as well as the cladding 12. In applying the stress, the stress applying parts 15 are disposed in a plurality of directions like the multicore polarization-maintaining fiber 10 according to the embodiment. Thus, the direction of the stress applied from the stress applying parts 15 to the cladding 12 is easily dispersed in multiple directions, reducing the deformation of the outer shape of the multicore polarization-maintaining fiber 10.

From the viewpoint of easily dispersing the direction of the stress applied from the stress applying parts 15 to the cladding 12 in multiple directions as described above, the conditions that are thought to be preferable to dispose the plurality of stress applying parts 15 are as follows. In other words, preferably, the plurality of stress applying parts 15 is disposed in a first direction and a direction orthogonal to the first direction. The plurality of stress applying parts 15 is disposed in the directions orthogonal to each other, also causing the stress applied from the stress applying parts 15 to the cladding 12 to act on the directions orthogonal to each other. Thus, the deformation of the outer shape of the multicore polarization-maintaining fiber 10 is easily reduced.

It is also preferable to dispose the plurality of stress applying parts 15 along a plurality of parallel columns. The plurality of stress applying parts 15 is disposed along a plurality of columns, also causing the direction of the stress applied from the stress applying parts 15 to the cladding 12 to be easily dispersed. Thus, the deformation of the outer shape of the multicore polarization-maintaining fiber 10 is easily reduced.

It is also preferable to dispose the plurality of stress applying parts 15 at positions in 90 degree rotational symmetry based on the center of the cladding 12. The plurality of stress applying parts 15 is disposed in this manner, also causing the direction of the stress applied from the stress applying parts 15 to the cladding 12 to be easily dispersed. Thus, the deformation of the outer shape of the multicore polarization-maintaining fiber 10 is easily reduced.

The multicore polarization-maintaining fiber 10 according to the embodiment satisfies all the conditions that are preferable to dispose the plurality of stress applying parts 15. However, the present invention is not limited to the form that satisfies all the conditions. Other embodiments of the present invention will be described later.

In the multicore polarization-maintaining fiber 10 according to the embodiment, one stress applying part 15 is disposed so as to apply necessary stress to two cores 11. In other words, four stress applying parts 15 are disposed as though these four stress applying parts 15 make four pairs. Thus, the four stress applying parts 15 can apply stress to four cores 11. The stress applying parts 15 are disposed in this manner, allowing a decrease in the number of the stress applying parts 15, which are necessary in the case of disposing the same number of the cores 11. Thus, an increase in the diameter of the cladding 12 can be reduced. An increase in the diameter of the cladding 12 can be reduced, allowing a reduction in an increase in the probability of breaking the multicore polarization-maintaining fiber 10 even though the bending diameter is small in the layout of the multicore polarization-maintaining fiber 10 in a small space.

Note that, the size of the stress applying part 15 or the interval to dispose the adjacent stress applying parts is appropriately adjusted based on the difference between the thermal expansion coefficient of the cladding and the thermal expansion coefficient of the stress applying part 15, also allowing the diameter of the cladding 12 to be adjusted.

The diameter of the cladding 12 is adjusted as described above, allowing the disposition of the stress applying parts 15 so as to apply suitable stress to the plurality of cores 11, even though the diameter of the cladding 12 is set to the diameter of 125 μm or less, which is the same as the diameter of a previously existing polarization-maintaining fiber (e.g. about 80 μm), for example. Thus, the multicore polarization-maintaining fiber 10 including a plurality of cores 11 having a desired polarization maintaining power can be obtained.

The size of the stress applying part 15 can be appropriately changed suitable for the difference between the thermal expansion coefficient of the cladding 12 and the thermal expansion coefficient of the stress applying part 15, for example. For instance, in the case in which the diameter of the cladding 12 is 125 μm, the diameter of the stress applying part 15 can be 20 μm or more, and is preferably 30 μm or more. An increase in the size of the stress applying part 15 easily applies a necessary stress to the core 11. From this viewpoint, the cross sectional area of the stress applying part 15 is greater than the cross sectional area of the core 11. The interval to dispose the pair of stress applying parts 15 sandwiching the core 11 can be 10 μm or less as long as the core 11 can be disposed between them, which is preferably 8 μm or less. The interval to dispose the stress applying parts 15 is narrowed to provide advantages of easily decreasing the diameter of the cladding 12 and easily applying a necessary stress to the core 11.

Note that, in the present specification, the cores 11 are each disposed between all the stress applying parts 15 adjacent to each other. The term "the stress applying parts 15 adjacent to each other" means a pair of stress applying parts 15 disposed so as to apply a necessary stress to the core 11. The cores 11 are disposed in this manner, efficiently disposing many cores 11 on one multicore polarization-maintaining fiber 10. Thus, the transmission capacity of information is increased.

The core 11 receives the compressive stress and the tensile stress from the paired stress applying part 15 as described above to have the birefringence. The core 11 has the slow axis in the direction to which the compressive stress is applied, and has the fast axis in the direction to which the tensile stress is applied. In two cores 11 disposed in the directions different by an angle of 90° with respect to a stress applying part 15 based on this stress applying part 15, the directions in which the core 11 is sandwiched by the pair of stress applying parts 15 are different from each other at an angle of 90°. Thus, the directions which the compressive stress and the tensile stress are applied to these two cores 11 are different from each other at an angle of 90°. In other words, the multicore polarization-maintaining fiber 10 includes the cores 11 whose directions of the fast axis and the slow axis are different from each other at an angle of 90°. When signals are transmitted along the fast axis and the slow axis of the cores 11 whose directions of the fast axis and the slow axis are different from each other, the propagation constants are changed. Thus, the crosstalk between the cores 11 can be decreased.

As described above, the plurality of cores 11 preferably has cutoff wavelengths different from each other. However, even the cores 11 having the cutoff wavelengths different from each other have an equivalent birefringence when the interval to dispose the pair of stress applying parts 15 applying stress to the cores 11, the size of the stress applying parts 15, and the thermal expansion coefficient of the stress applying parts 15 are equal. Meanwhile, in the case in which the birefringence is to be changed in each of the cores 11, the strength of the stress applied from the stress applying part 15 to the core 11 only has to be adjusted as described above.

(Second Embodiment)

Next, referring to FIG. 2, a second embodiment of the present invention will be described in detail. Note that, components the same as or equivalent to ones of the embodiment described so far are designated the same reference numerals and signs, and the overlapping description is omitted, unless otherwise specified.

Figure 2:
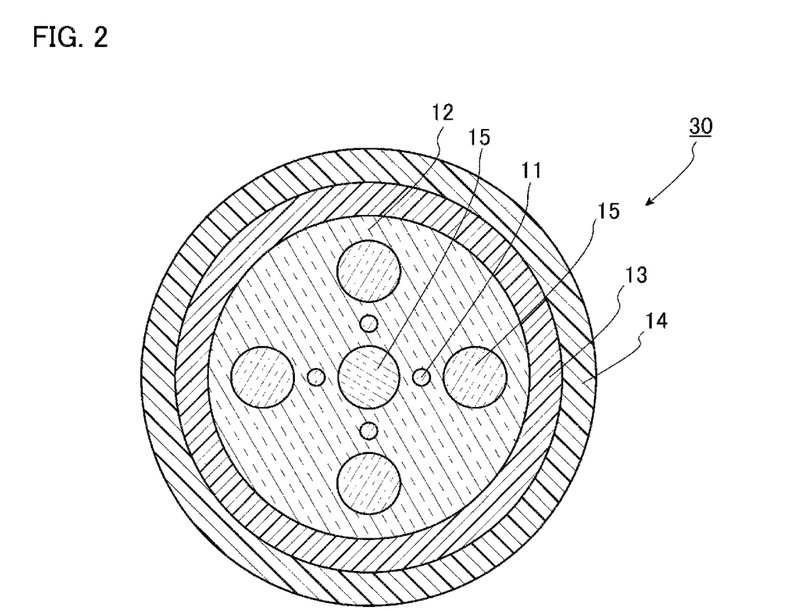
FIG. 2 is a diagram of a cross section perpendicular to the longitudinal direction of a multicore polarization-maintaining fiber according to a second embodiment of the present invention.

FIG. 2 is a diagram of a cross section perpendicular to the longitudinal direction of a multicore polarization-maintaining fiber 30 according to the second embodiment of the present invention. The multicore polarization-maintaining fiber 30 has a configuration similar to the configuration of the multicore polarization-maintaining fiber 10 except the numbers and disposition of cores 11 and stress applying parts 15.

The multicore polarization-maintaining fiber 30 includes four cores 11 and five stress applying parts 15. In the five stress applying parts 15, one stress applying part 15 is disposed in the center of a cladding 12, and the other four stress applying parts 15 are disposed at the apexes of a square where the center of the cladding 12 is the center. Therefore, the stress applying parts 15 are disposed in a first direction (in the vertical direction on the paper of FIG. 2) and disposed in a direction perpendicular to this direction (in the lateral direction on the paper of FIG. 2). The plurality of stress applying parts 15 is disposed at positions in 90 degree rotational symmetry based on the center of the cladding 12. The plurality of stress applying parts 15 is disposed in this manner, and the deformation of the outer shape of the multicore polarization-maintaining fiber 30 is reduced as described above.

In the multicore polarization-maintaining fiber 30, the stress applying part 15 is disposed in the center of the cladding 12. With this form, the stress applying part 15 disposed in the center of the cladding 12 and the stress applying parts 15 disposed near the outer circumferential surface of the cladding 12 are disposed being paired as the core 11 is sandwiched between them. The cores 11 and the stress applying parts 15 are disposed in this manner. Thus, the stress applying part 15 disposed in the center of the cladding 12 is provided between the adjacent cores 11. Consequently, the crosstalk between the adjacent cores 11 can be reduced.

The four cores 11 included in the multicore polarization-maintaining fiber 30 are disposed between one stress applying part 15 disposed in the center of the cladding 12 and the other four stress applying parts 15 disposed surrounding the one stress applying part 15. In other words, the five stress applying parts 15 are disposed to make four pairs. Thus, suitable stress is applied from these five stress applying parts 15 to the four cores 11.

According to the multicore polarization-maintaining fiber 30 thus configured, the cores 11 are each disposed being sandwiched by the pair of stress applying parts 15. Thus, the cores 11 having a desired polarization maintaining power similarly to the multicore polarization-maintaining fiber 10 are obtained. In the embodiment, the cores 11 are each disposed between all the stress applying parts 15 adjacent to each other. The cores 11 are disposed in this manner, efficiently disposing many cores 11 on one multicore polarization-maintaining fiber 30. Consequently, the transmission capacity of information is increased.

Similarly to the multicore polarization-maintaining fiber 10, also in the multicore polarization-maintaining fiber 30, the cutoff wavelengths of the cores 11 can be individually changed. The mode birefringence of the multicore polarization-maintaining fiber 30 thus configured can be $4 \times 10^{-4}$ or more, for example, in each of the cores 11. At wavelengths at which a single mode is achieved at a wavelength longer than the cutoff wavelengths of the cores 11, the attenuation is 0.1 dB or less even though the multicore polarization-maintaining fiber 30 is wound for ten times in a diameter of 30 mm.

(Third Embodiment)

Next, referring to FIG. 3, a third embodiment of the present invention will be described in detail. Note that, components the same as or equivalent to ones of the embodiments described so far are designated the same reference numerals and signs, and the overlapping description is omitted, unless otherwise specified.

Figure 3:
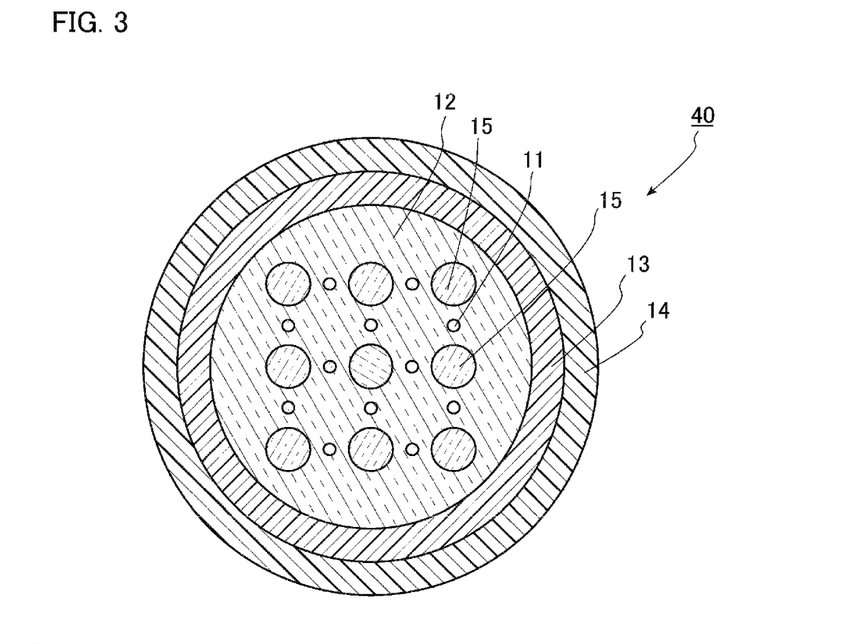
FIG. 3 is a diagram of a cross section perpendicular to the longitudinal direction of a multicore polarization-maintaining fiber according to a third embodiment of the present invention.

FIG. 3 is a diagram of a cross section perpendicular to the longitudinal direction of a multicore polarization-maintaining fiber 40 according to the third embodiment of the present invention. The multicore polarization-maintaining fiber 40 has a configuration similar to the configuration of the multicore polarization-maintaining fiber 10 except the numbers and disposition of cores 11 and stress applying parts 15.

The multicore polarization-maintaining fiber 40 includes twelve cores 11 and nine stress applying parts 15. The nine stress applying parts 15 are disposed in lattices three in length and three in breadth at regular intervals. Therefore, the stress applying parts 15 are disposed in a first direction (in the vertical direction on the paper of FIG. 3) and disposed in a direction perpendicular to this direction (in the lateral direction on the paper of FIG. 3). In the nine stress applying parts 15, the stress applying part 15 disposed in the center is disposed in the center of the cladding 12. It is thought that the plurality of stress applying parts 15 disposed in this manner is disposed along a plurality of parallel columns (in the vertical direction or the lateral direction on the paper of FIG. 3) or that the plurality of stress applying parts 15 is disposed at positions in 90 degree rotational symmetry based on the center of the cladding 12. The plurality of stress applying parts 15 is disposed in this manner, reducing the deformation of the outer shape of the multicore polarization-maintaining fiber 40 as described above.

The twelve cores 11 included in the multicore polarization-maintaining fiber 40 are each disposed between the adjacent stress applying parts 15. The cores 11 are each disposed being sandwiched by the pair of stress applying parts 15. Thus, similarly to the multicore polarization-maintaining fiber 10, the cores 11 having a desired polarization maintaining power are obtained.

According to the multicore polarization-maintaining fiber 40, the cores 11 are each disposed between all the stress applying parts 15 adjacent to each other, efficiently disposing many cores 11 on one multicore polarization-maintaining fiber 40. Thus, the transmission capacity of information is increased. The stress applying parts 15 are disposed in this manner, allowing a decrease in the number of the stress applying parts 15, which are necessary in the case of disposing the same number of the cores 11. Consequently, an increase in the diameter of the cladding 12 can be reduced.

Similarly to the multicore polarization-maintaining fiber 10, also in the multicore polarization-maintaining fiber 40, the cutoff wavelengths of the cores 11 can be individually changed. The mode birefringence of the multicore polarization-maintaining fiber 40 thus configured can be $3 \times 10^{-4}$ or more, for example, in each of the cores 11. At wavelengths at which a single mode is achieved at a wavelength near the cutoff wavelengths of the cores 11, the attenuation is 0.1 dB or less even though the multicore polarization-maintaining fiber 40 is wound for ten times in a diameter of 30 mm.

(Fourth Embodiment)

Next, referring to FIG. 4, a fourth embodiment of the present invention will be described in detail. Note that, components the same as or equivalent to ones of the embodiments described so far are designated the same reference numerals and signs, and the overlapping description is omitted, unless otherwise specified.

Figure 4:
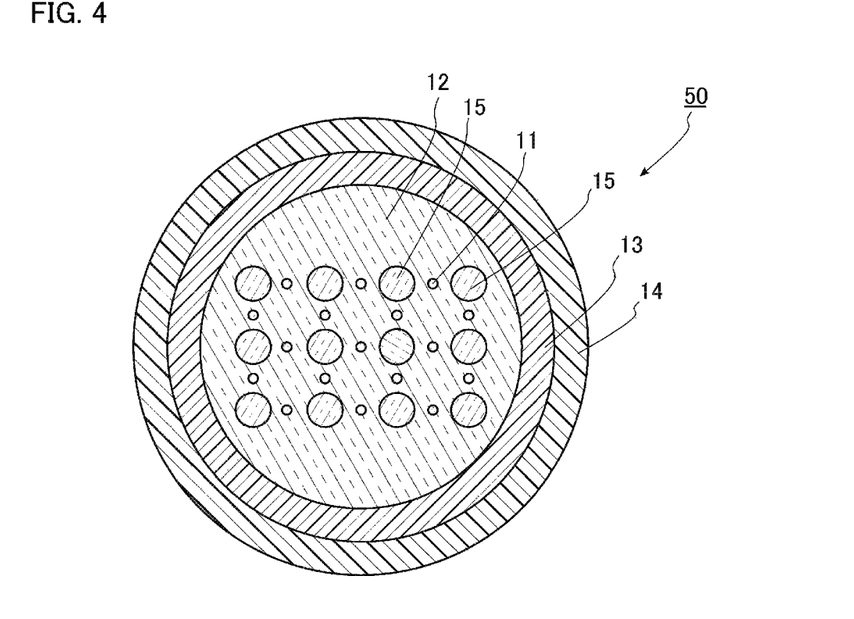
FIG. 4 is a diagram of a cross section perpendicular to the longitudinal direction of a multicore polarization-maintaining fiber according to a fourth embodiment of the present invention.

FIG. 4 is a diagram of a cross section perpendicular to the longitudinal direction of a multicore polarization-maintaining fiber 50 according to the fourth embodiment of the present invention. The multicore polarization-maintaining fiber 50 has a configuration similar to the configuration of the multicore polarization-maintaining fiber 10 except the numbers and disposition of cores 11 and stress applying parts 15.

The multicore polarization-maintaining fiber 50 includes seventeen cores 11 and twelve stress applying parts 15. The twelve stress applying parts 15 are disposed in lattices three in length and four in breadth at regular intervals. Therefore, the stress applying parts 15 are disposed in a first direction (in the vertical direction on the paper of FIG. 4) and disposed in a direction perpendicular to this direction (in the lateral direction on the paper of FIG. 4). It is also thought that the plurality of stress applying parts 15 disposed in this manner is disposed along a plurality of parallel columns (in the vertical direction or the lateral direction on the paper of FIG. 4). The plurality of stress applying parts 15 is disposed in this manner, reducing the deformation of the outer shape of the multicore polarization-maintaining fiber 50 as described above.

The seventeen cores 11 included in the multicore polarization-maintaining fiber 50 are each disposed between the adjacent stress applying parts 15. The cores 11 are each disposed being sandwiched by the pair of stress applying parts 15 in this manner. Thus, similarly to the multicore polarization-maintaining fiber 10, the cores 11 having a desired polarization maintaining power are obtained. According to the multicore polarization-maintaining fiber 50, the cores 11 are each disposed between all the stress applying parts 15 adjacent to each other, efficiently disposing many cores 11 on one multicore polarization-maintaining fiber 50. Thus, the transmission capacity of information is increased. The stress applying parts 15 are disposed in this manner, allowing a decrease in the number of the stress applying parts 15, which are necessary in the case of disposing the same number of the cores 11. Thus, an increase in the diameter of the cladding 12 can be reduced.

The multicore polarization-maintaining fiber 50 includes the stress applying parts 15 and the cores 11 in numbers greater than those of the multicore polarization-maintaining fibers of the embodiments described so far. Thus, the diameter of the cladding 12 is preferably increased more than in the multicore polarization-maintaining fibers described so far. An increase in the diameter of the cladding 12 easily disposes many cores 11 having a desired polarization maintaining power. An increase in the diameter of the cladding 12 easily disposes the stress applying part 15 in a ledge size. Thus, the cores 11 having a higher mode birefringence are easily formed.

The diameter of the cladding 12 included in the multicore polarization-maintaining fiber 50 can be 150 µm, for example. The diameter of the stress applying part 15 can be 20 µm or more, for example, and the interval to dispose the adjacent stress applying parts 15 can be 10 µm or less, for example.

Similarly to the multicore polarization-maintaining fiber 10, also in the multicore polarization-maintaining fiber 50, the cutoff wavelengths of the cores 11 can be individually changed. The mode birefringence of the multicore polarization-maintaining fiber 50 thus configured can be $3 \times 10^{-4}$ or more, for example, in each of the cores 11. At wavelengths at which a single mode is achieved at a wavelength longer than the cutoff wavelengths of the cores 11, the attenuation is 0.1 dB or less even though the multicore polarization-maintaining fiber 50 is wound for ten times in a diameter of 30 mm.

(Fifth Embodiment)

Next, referring to FIG. 5, a fifth embodiment of the present invention will be described in detail. Note that, components the same as or equivalent to ones of the embodiments described so far are designated the same reference numerals and signs, and the overlapping description is omitted, unless otherwise specified.

Figure 5:
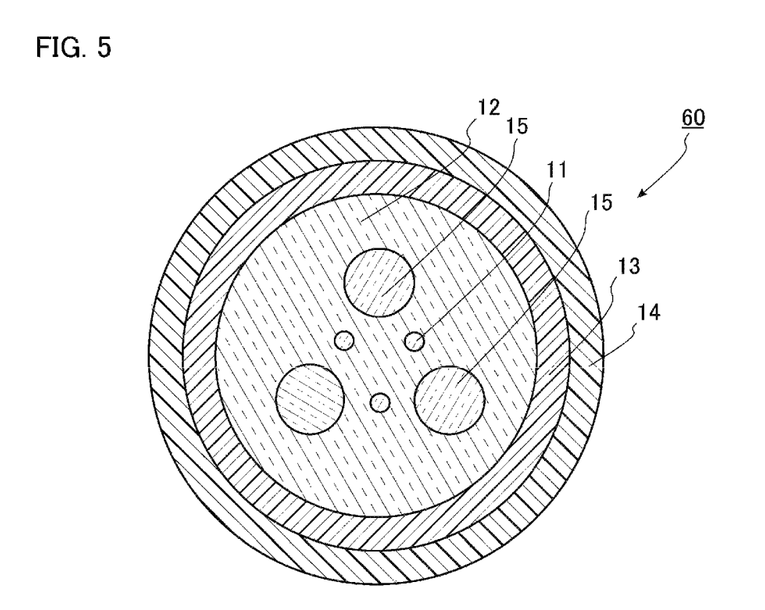
FIG. 5 is a diagram of a cross section perpendicular to the longitudinal direction of a multicore polarization-maintaining fiber according to a fifth embodiment of the present invention.

FIG. 5 is a diagram of a cross section perpendicular to the longitudinal direction of a multicore polarization-maintaining fiber 60 according to the fifth embodiment of the present invention. The multicore polarization-maintaining fiber 60 has a configuration similar to the configuration of the multicore polarization-maintaining fiber 10 except the numbers and disposition of cores 11 and stress applying parts 15.

The multicore polarization-maintaining fiber 60 includes three cores 11 and three stress applying parts 15. The three stress applying parts 15 are disposed at the positions of the apexes of a triangle. The three cores 11 are disposed on the sides of the triangle. In this manner, the stress applying parts 15 are disposed in a first direction (in the lateral direction on the paper of FIG. 5) and also disposed in a second direction. Thus, the deformation of the outer shape of the multicore polarization-maintaining fiber 60 is reduced as described above.

The three cores 11 included in the multicore polarization-maintaining fiber 60 are each disposed between the adjacent stress applying parts 15. In this manner, the cores 11 are each disposed being sandwiched by the pair of stress applying parts 15. Thus, similarly to the multicore polarization-maintaining fiber 10, the cores 11 having a desired polarization maintaining power are obtained. According to the multicore polarization-maintaining fiber 60, the cores 11 are each disposed between all the stress applying parts 15 adjacent to each other, efficiently disposing many cores 11 on one multicore polarization-maintaining fiber 60. Thus, the transmission capacity of information is increased. The stress applying parts 15 are disposed in this manner, allowing a decrease in the number of the stress applying parts 15, which are necessary in the case of disposing the same number of the cores 11. Consequently, an increase in the diameter of the cladding 12 can be reduced.

As described above, the present invention is described based on the first to the fifth embodiments by examples. However, the present invention is not limited to these embodiments. For example, in the present invention, the numbers of and the positions to dispose the cores 11 and the stress applying parts 15 are not limited to the embodiments described so far. A configuration only has to be provided in which each of the plurality of cores 11 included in one multicore polarization-maintaining fiber is disposed at the position sandwiched by the pair of stress applying parts 15, and the plurality of stress applying parts is disposed in a first direction and also disposed in a second direction different from the first direction.

For example, in the first embodiment and the other embodiments, an example is taken in which the stress applying parts are disposed at the positions corresponding to the apexes of a square. However, the present invention may be a form in which the stress applying parts are disposed at positions corresponding to the apexes of a rectangle, a parallelogram, and other polygons. However, the stress applying parts are disposed at positions corresponding to the apexes of a square or a rectangle, easily disposing many the cores 11 as well as easily applying suitable stress to the cores 11.

In the embodiments described so far, a form is exemplified in which the cores 11 are each disposed between all the stress applying parts 15 adjacent to each other. However, the present invention is not limited to this form. No cores 11 may be disposed between the adjacent stress applying parts 15. However, from the viewpoints of increasing the transmission capacity of information and reducing an increase in the diameter of the cladding 12, for example, the cores 11 are each preferably disposed between all the stress applying parts 15 adjacent to each other.

(Manufacturing Method)

The multicore polarization-maintaining fibers described so far can be manufactured as described below, for example.

First, materials exemplified blow are prepared to fabricate a preform.

For a material configuring the cladding 12, for example, a pure silica rod or silica rod, with which fluorine is doped, is prepared. For a material configuring the core 11, for example, a silica rod, with which germanium is doped, is prepared in the case in which the cladding 12 is pure silica, or a pure silica rod is prepared in the case in which the cladding 12 is made of silica, with which fluorine is doped.

Subsequently, holes are formed on the silica rod, which is the material of the cladding 12, in such a manner that the cores 11 are disposed at desired positions when the preform is drawn. The silica rods, which are the materials configuring the cores 11, are inserted into the holes on the silica rod. The silica rods are heated to integrate them.

Subsequently, holes, into which materials configuring the stress applying parts 15 are to be inserted, are formed on the rod including the materials configuring the cladding 12 and the cores 11 prepared as described above. For the stress applying part 15, a material having a thermal expansion coefficient greater than the thermal expansion coefficient of the cladding 12 is used. For the material configuring the stress applying part 15, a silica rod, with which boron, for example, is doped, is used.

As described above, the preform having the materials configuring the cores 11, the cladding 12, and the stress applying parts 15 is prepared. This preform is placed on a drawing furnace for integrating the rods to produce a fiber string. Thus, the multicore polarization-maintaining fiber according to the present invention can be obtained. A method for forming the inner protective layer 13 and the outer protective layer 14 is not limited specifically.

Note that, in the case in which the cores 11 having different cutoff wavelengths are disposed, a method only has to be provided, in which the cores 11 are formed using silica rods in the same diameter with a different refractive index, or the cores 11 are formed using silica rods in different diameters so that the diameter of the core 11 and the diameter of the cladding 12 are changed for each core 11 in advance.

As described above, according to the present invention, there is provided a multicore polarization-maintaining fiber that reduces the deformation of its outer shape, which is expected to be used in the technical field of processing fiber laser devices, for example.

REFERENCE SIGNS LIST 10, 30, 40, 50, 60 . . . multicore polarization-maintaining fiber
11 . . . core
12 . . . cladding
13 . . . inner protective layer
14 . . . outer protective layer
15 . . . stress applying part

The invention claimed is:

1. A multicore polarization-maintaining fiber comprising:
a plurality of cores;
a cladding surrounding the plurality of cores; and
a plurality of stress applying parts provided sandwiching the plurality of cores in a region surrounded by an outer circumferential surface of the cladding, wherein:
a cross sectional area of each of the stress applying parts is greater than a cross sectional area of each of the cores; and
the stress applying parts include a first pair of stress applying parts and a second pair of stress applying parts, wherein the first pair of the stress applying parts sandwiches a first one of the cores therebetween and are disposed in a first direction to sandwich the first core in a cross section perpendicular to a longitudinal direction of the cladding, and the second pair of the stress applying parts sandwiches a second one of the cores therebetween and are disposed in a second direction to sandwich the second core, the second direction being different from and intersecting with the first direction in the cross section.

2. The multicore polarization-maintaining fiber according to claim 1, wherein
the first direction is orthogonal to the second direction.

3. The multicore polarization-maintaining fiber according to claim 1, wherein the plurality of stress applying parts is disposed along a plurality of parallel columns in the cross section.

4. The multicore polarization-maintaining fiber according to claim 1, wherein the plurality of stress applying parts is disposed at positions in 90 degree rotational symmetry about a center of the cladding in the cross section.

5. The multicore polarization-maintaining fiber according to claim 1, wherein one of the plurality of stress applying parts is disposed in a center of the cladding in the cross section.

6. The multicore polarization-maintaining fiber according to claim 1, wherein every pair of the stress applying parts adjacent to each other sandwiches at least one of the cores.

7. The multicore polarization-maintaining fiber according to claim 1, wherein the cores include two cores whose directions in which the two cores are sandwiched by the stress applying parts respectively are different from each other at an angle of 90°.

8. The multicore polarization-maintaining fiber according to claim 1, wherein the cores include two cores having cutoff wavelengths different from each other.

9. The multicore polarization-maintaining fiber according to claim 8, wherein the two cores having cutoff wavelengths different from each other have birefringences different from each other.

10. The multicore polarization-maintaining fiber according to claim 1, wherein one stress applying part of the first pair of the stress applying parts and one stress applying part of the second pair of the stress applying parts are the same stress applying part.

* * * * *